US005377092A

United States Patent [19]

[11] Patent Number: 5,377,092

[45] Date of Patent: Dec. 27, 1994

Rowand, Jr. et al.

[54] METHOD AND APPARATUS FOR HARMONIC DISTORTION CORRECTION

[75] Inventors: Edwin W. Rowand, Jr.; Donald J. Lucas, both of Richardson, Tex.

[73] Assignee: International Power Machines, Garland, Tex.

[21] Appl. No.: 977,018

[22] Filed: Nov. 16, 1992

[51] Int. Cl.[5] ............ H02M 1/12

[52] U.S. Cl. ............ 363/41; 363/39; 363/95

[58] Field of Search ............ 363/39, 40, 41, 95, 363/97, 98

[56] References Cited

U.S. PATENT DOCUMENTS

| | | | |
|---|---|---|---|
| 3,883,792 | 5/1975 | Ellert | 363/39 |
| 4,812,669 | 3/1989 | Takeda et al. | 363/98 |
| 4,964,027 | 10/1990 | Cook et al. | 363/40 |
| 5,001,619 | 3/1991 | Nakajima et al. | 363/41 |
| 5,001,622 | 3/1991 | Kirchberg et al. | 363/41 |
| 5,034,876 | 7/1991 | Kirchberg et al. | 363/97 |
| 5,047,909 | 9/1991 | Hosoda | 363/40 |
| 5,138,247 | 8/1992 | Tanoue et al. | 323/207 |
| 5,235,503 | 8/1993 | Stemmler et al. | 363/39 |

*Primary Examiner*—Jeffrey L. Sterrett
*Attorney, Agent, or Firm*—Harold E. Meier

[57] ABSTRACT

There is described a method and apparatus for substantially cancelling harmonic distortion from the output voltage signal of a power supply. The system samples the output of the power supply and detects the harmonic distortion within the output signal. After the harmonic distortion is detected, the amplitude of the real and imaginary components of the harmonic distortion are determined. The amplitude components are applied to a PI compensator to generate the harmonic distortion correction signal necessary to substantially cancel harmonic distortion from the output voltage signal. The harmonic distortion correction signal is then applied to the power supply.

17 Claims, 5 Drawing Sheets

METHOD AND APPARATUS FOR HARMONIC DISTORTION CORRECTION

TECHNICAL FIELD

This invention relates to harmonic distortion correction, and more particularly to a method and apparatus for generating a correction signal for substantially removing harmonic distortions from a power supply output voltage signal.

BACKGROUND OF THE INVENTION

A major problem arising in the use of an uninterruptable power supply (UPS) occurs when harmonic distortion is induced within the output voltage signal. Uninterruptable power sources typically have a high source impedance when looking back into the device from the UPS output terminals that promotes harmonic distortions.

One currently utilized method for eliminating harmonic distortions in the output voltage of a UPS comprises the use of low-impedance notch filters coupled to the UPS output. These filters decrease the output impedance of the power supply at the resonant frequency and consequently decrease the harmonic distortion induced in the output voltage signal. However, the use of the bulky hardware components required for the filters adds to the size and weight of a UPS and increases the possibility of failure of the UPS due to the breakdown of a component. Thus, a need has arisen for a system for correcting harmonic distortion that does not substantially increase the size, weight and reliability of an uninterruptable power source.

SUMMARY OF THE INVENTION

The present invention overcomes the foregoing and other problems by using a negative feedback system for harmonic distortion correction. The output signal of an uninterruptable power supply (UPS) is sampled and converted to a digital signal that is processed in a negative feedback loop.

The amplitude of the harmonic distortion signal within the output signal is detected and extracted by a harmonic detector. A proportional integral compensator utilizes the amplitude to estimate a correction signal that would drive the input of the compensator toward zero. The correction signal is generated by multiplying a set of table values by the output of the proportional integral compensator. The result is applied to the power supply generating the UPS output voltage signal and produces an output signal substantially free of harmonic distortion.

BRIEF DESCRIPTION OF THE DRAWINGS

For a more complete understanding of the present invention and the advantages thereof, reference is now made to the following detailed description taken in conjunction with the accompanying drawings.

DETAILED DESCRIPTION OF THE INVENTION.

Figure 1C:
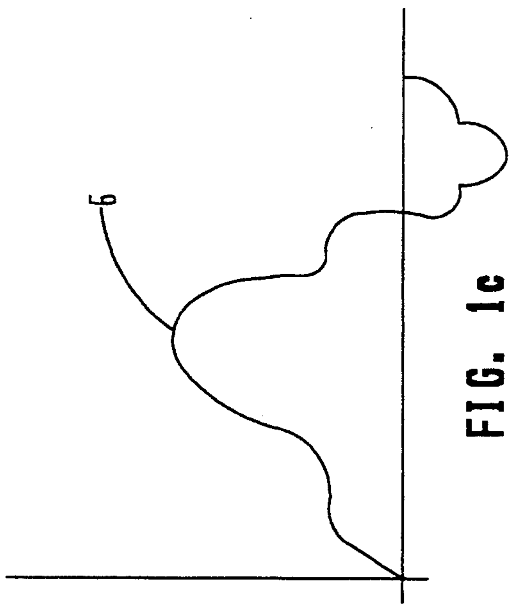
FIGS. 1*a*, 1*b* and 1*c* are diagrams illustrating the effect of a harmonic distortion signal upon a sinusoidal output signal.
Figure 1A:
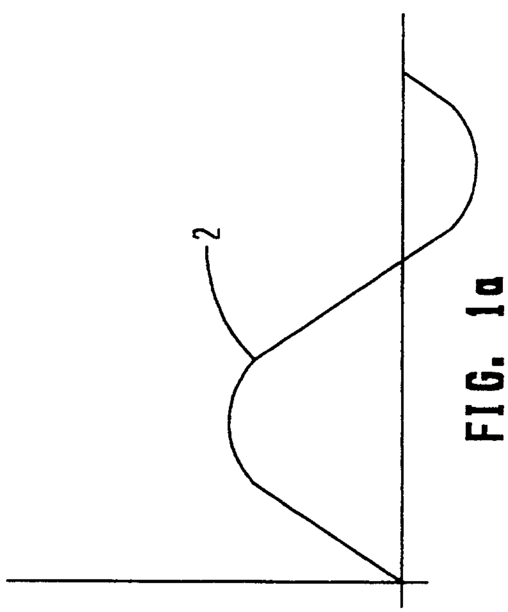
Figure 1B:
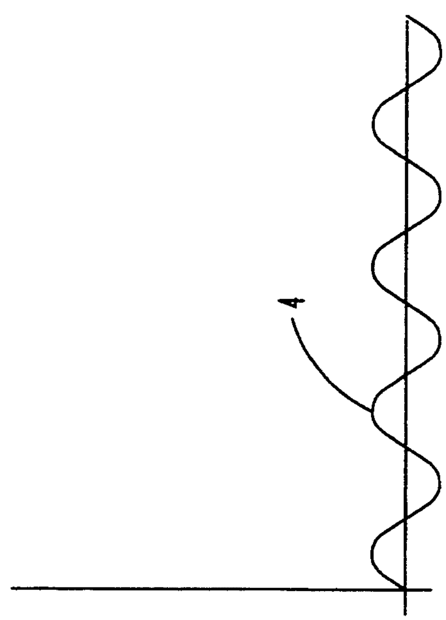

Referring now to the drawings, and more particularly to FIGS. 1*a*, 1*b* and 1*c*, there is illustrated the effect of harmonic distortion on a sinusoidal output signal. The output voltage signal 2 of an uninterruptable power supply (UPS) ideally appears as a periodic function (i.e., a single frequency sinusoid). However, when harmonic distortions 4 are introduced into the output of the UPS, the output signal 6 is a distorted periodic function.

Figure 2:
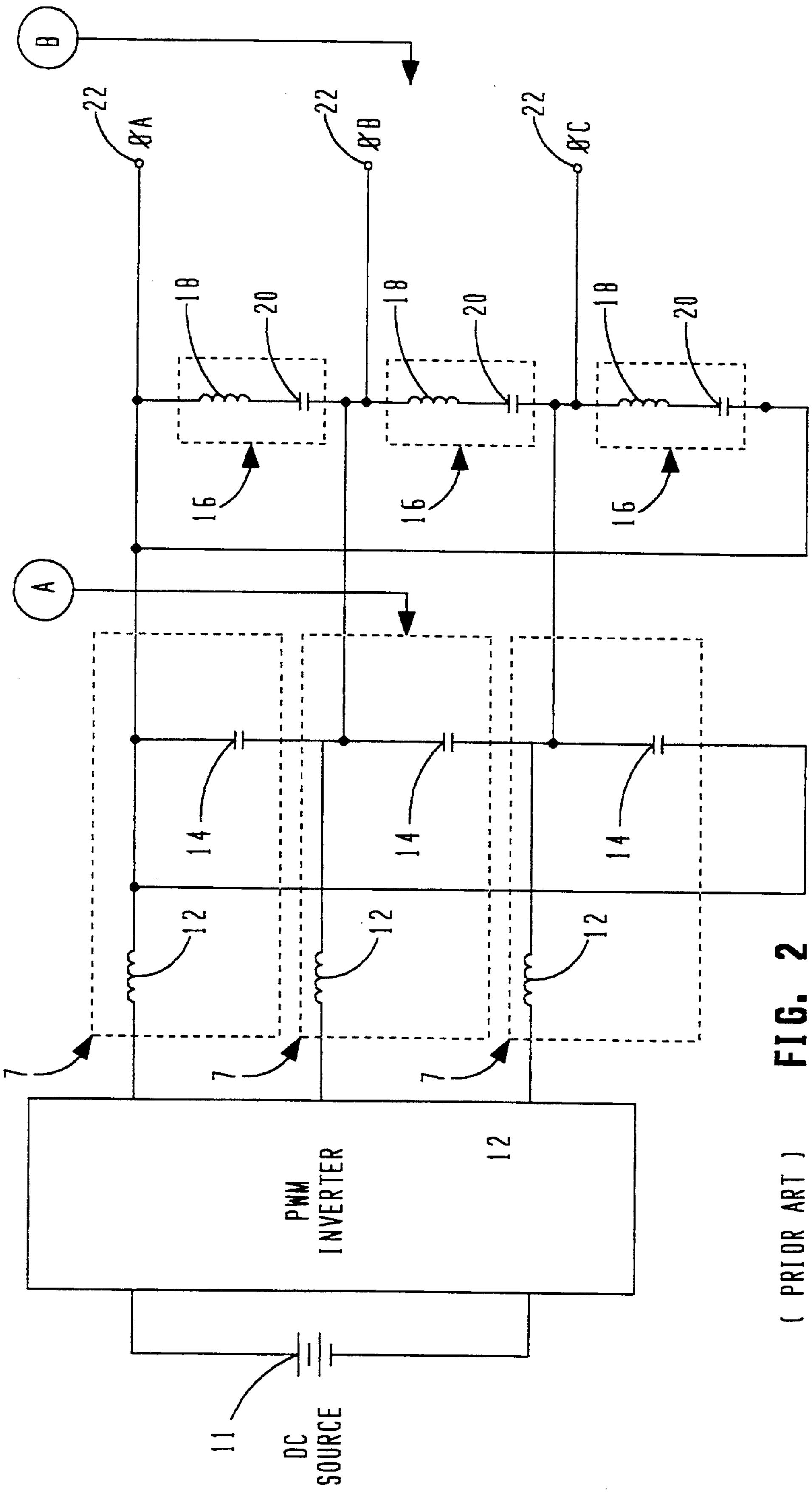
FIG. 2 is a schematic drawing illustrating a prior art method of filtering the output of an uninterruptable power supply to eliminate induced harmonic distortions.

FIG. 2 illustrates one prior art system for reducing the incidence of harmonic distortion within the output voltage of an uninterruptable power supply 8. The UPS 8 comprises a DC power source 11, a three-phase inverter circuit 10 and three low-pass filters 7. The inverter 10 converts an input signal from DC power source 11 to a pulse width modulated (PWM) analog output voltage signal.

An inductor 12 and capacitor 14 form each low-pass filter 7 at the output of the UPS 8 for filtering the PWM signal and generating a 60-Hz sine wave signal (reference number 2 in FIG. 1*a*) comprising the output of the UPS. This configuration creates a high-impedance source at higher order multiples of the fundamental output frequency when looking back into the UPS 8 from reference point A. The high-impedance source supports harmonic voltage distortions (reference number 4 in FIG. 1*b*) at the output signal (reference number 6 in FIG. 1*c*of the UPS 8.

This distortion problem has been remedied in the prior art UPS 8 by coupling notch filters 16 to the output of each phase of the UPS 8. Each notch filter 16 is composed of an inductor 18 in series with a capacitor 20 connected between two phases of the UPS 8 output. This arrangement reduces the source impedance when looking back into the UPS 8 from reference point B and minimizes the harmonic distortion effects present in the analog signal at the output terminals 22.

Figure 3:
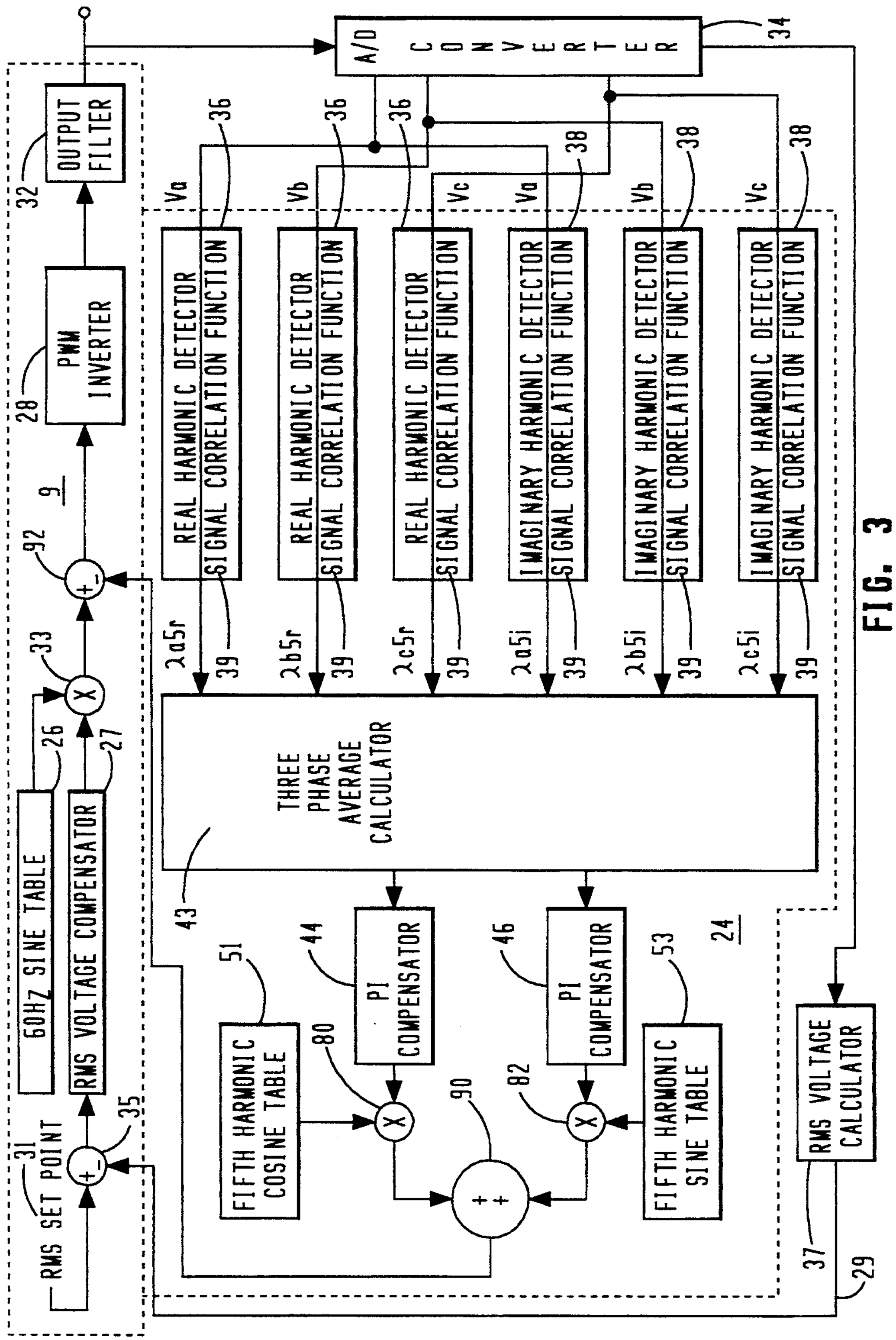
FIGS. 3 and 4 functional block diagrams showing the harmonic distortion correction system of the present invention.
Figure 4:
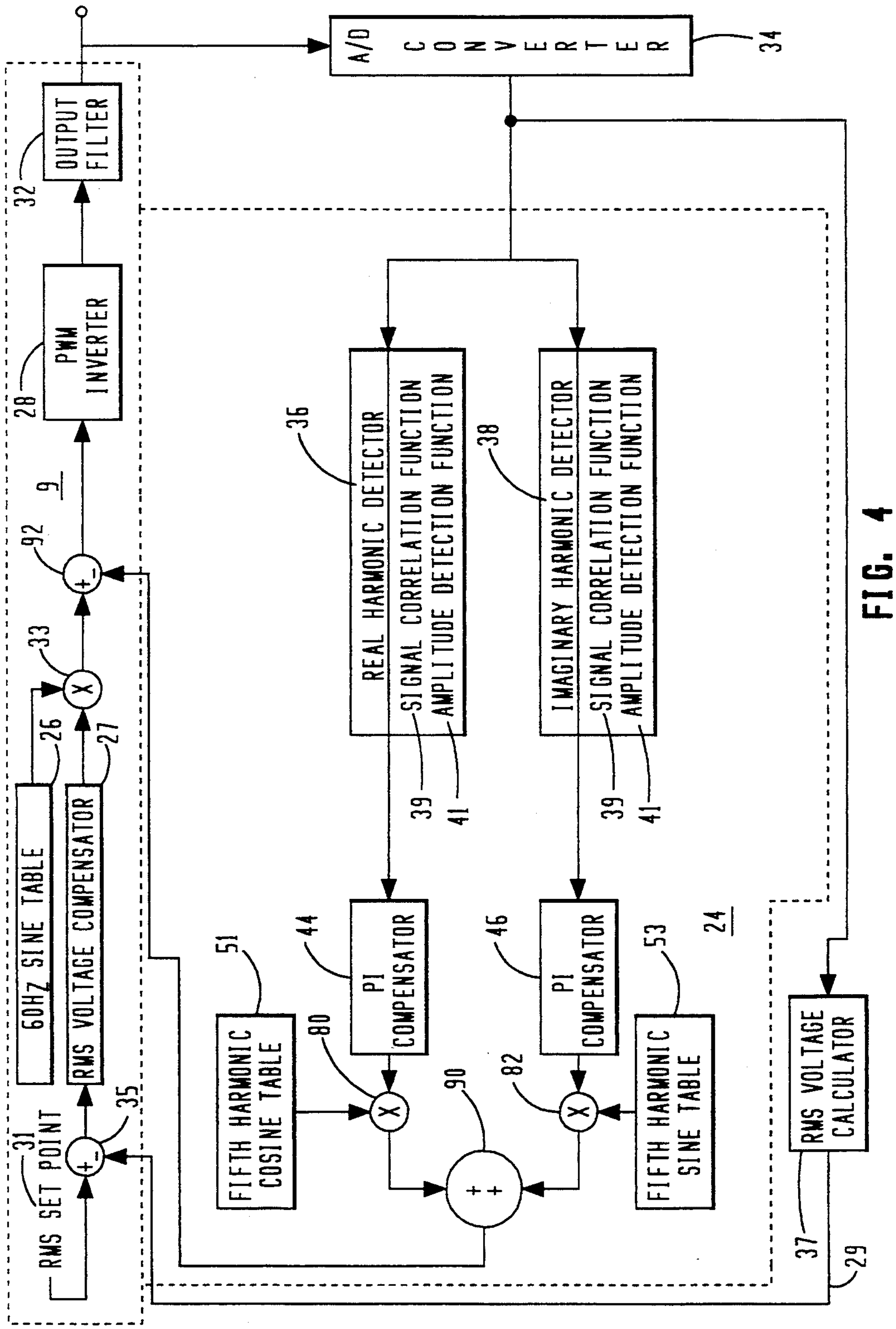

FIG. 3 illustrates a functional block diagram of the present invention utilizing a processor 24 in a negative feedback loop of the UPS 9. While the harmonic distortion correction system of the present invention will be described with respect to a three-phase system, it should be recognized that the system is easily adaptable to a single-phase system as shown in FIG. 4. Where applicable, the corresponding portions of FIGS. 3 and 4 are indicated by the same reference numbers. The UPS 9 contains a 60-Hz frequency sine look-up table 26 that stores digital values required for generating a 60-Hz sine wave. It should be noted that any frequency could be used by the sine look-up table 26 and the 60 Hz sine wave is given merely by way of example. The output from the sine table 26 is multiplied at multiplier 33 by a scaling factor generated by an RMS voltage compensator 27.

The RMS voltage compensator 27 is a proportional integral-differential (PID) compensator for a control loop 29. This compensator 27 generates whatever output value is necessary to drive the output of a subtractor 35 and the input to the compensator toward zero. In this case, the input is the difference between a desired set point RMS voltage (as indicated at 31) and the measured RMS output voltage at the output filter 32. This difference is calculated by the subtracter 35. The measured RMS output voltage is generated by an RMS voltage calculator 37. The input to the RMS voltage calculator 37 is a digital representation of the UPS output generated at the output of an A/D converter 34.

The result of the multiplication between the outputs of the sine table 26 and the RMS voltage compensator 27 is applied to the input of a PWM inverter 28 after a harmonic distortion correction signal is subtracted from the result in a feedback subtractor 92. The harmonic distortion correction signal will be more fully discussed later. The PWM inverter 28 converts the digital input signal into a pulse width modulated analog output signal. The width of each pulse is determined by the digital value input to the inverter 28. Finally, the pulse width modulated signal is filtered by a passive LC output filter 32. This output filter 32 is similar in design and function to the low-pass filter 7 described with respect to FIG. 2.

The negative feedback loop of the UPS 9 consists of an analog-to-digital (A/D) converter 34 for sampling the analog output of the LC output filter 32 and converting the sinusoidal output voltage signal of the UPS into a digital signal comprised of a series of digital frames for processing by the processor 24. The negative feedback loop generates the harmonic distortion correction signal mentioned above that is subtracted from the signal input to the PWM inverter 28. The processor 24 detects the harmonic distortion signal within the output voltage signal, determines the amplitude of the detected signal, and estimates a correction signal required to substantially remove the harmonic distortion signal from the output voltage signal.

The following description of the processor 24 is described with respect to cancellation of the fifth harmonic. It should be recognized that the use of the fifth harmonic within the description is only an example and not a limitation. Any harmonic whose frequency is below half of the sampling frequency can be cancelled from the output signal utilizing the method and apparatus of the present invention.

Each frame of the converted digital signal output from the A/D converter 34 passes to a real component harmonic detector 36 and an imaginary component harmonic detector 38 for the a, b and c phases of the output voltage circuit. The real component harmonic detector 36 extracts the amount of the harmonic signal in-phase with a cosine wave of the same frequency and outputs a value representing the amplitude of the real component of the fifth harmonic voltage. Likewise, the imaginary component harmonic detector 38 extracts the component of the harmonic distortion signal that is 90° out of phase with a cosine wave of the same frequency and outputs a value representing the amplitude of the imaginary component of the fifth harmonic voltage. The harmonic distortion signal is processed by a signal correlation function 39 and a amplitude detection function 41 within the harmonic detectors 36 and 38.

The real and imaginary values of the fifth harmonic distortion signal ($\Lambda_{a5}$) detected by the signal correlation function 39 can be mathematically expressed as follows:

$$\Lambda_{a5} = \sum_{n=0}^{N-1} v_a(n) * \cos\frac{5*2\pi n}{N} - j\sum_{n=0}^{N-1} v_a(n) * \sin\frac{5*2\pi n}{N} \tag{1}$$

$$\Lambda_{b5} = \sum_{n=0}^{N-1} v_b(n) * \cos\frac{5*2\pi n}{N} - j\sum_{n=0}^{N-1} v_b(h) * \sin\frac{5*2\pi n}{N} \tag{2}$$

$$\Lambda_{c5} = \sum_{n=0}^{N-1} v_c(n) * \cos\frac{5*2\pi n}{N} - j\sum_{n=0}^{N-1} v_c(h) * \sin\frac{5*2\pi n}{N} \tag{3}$$

wherein:

$v_a(n)$ is the output voltage signal on phase A at some time n.

$v_b(n)$ is the output voltage signal on phase B at some time n.

$v_c(n)$ is the output voltage signal on phase C at some time n.

The distortion signal may be represented more simply as:

$$\Lambda_{a5}=\lambda_{a5r}+j*\lambda_{a5i} \tag{4}$$

$$\Lambda_{b5}=\lambda_{b5r}+j*\lambda_{b5i} \tag{5}$$

$$\Lambda_{c5}=\lambda_{c5r}+j*\lambda_{c5i} \tag{6}$$

wherein:

$\lambda_{a5r}$ is the real component of $\Lambda_{a5}$; and $\lambda_{a5i}$ is the imaginary component of $\Lambda_{a5}$.

$\lambda_{b5r}$ is the real component of $\Lambda_{b5}$; and $\lambda_{b5i}$ is the imaginary component of $\Lambda_{b5}$.

$\lambda_{c5r}$ is the real component of $\Lambda_{c5}$; and $\lambda_{c5i}$ is the imaginary component of $\Lambda_{c5}$.

once the harmonic distortion signal is detected, the three phase average calculator 43 computes the real and imaginary components of the amplitude of the harmonic distortion signal. The calculator 43 averages the fifth harmonic voltage component of the three phases of the harmonic distortion signal and computes the amplitude of the real and imaginary components of the harmonic distortion signal detected by the signal correlation function 39.

The real and imaginary portions of the average voltage ($V_{5r}$ and $V_{5i}$) are calculated according to the following equations:

$$V_{5r} = \frac{Re\{\Lambda_{a5}\} + Re\{\Lambda_{b5}e^{-j\frac{2\pi}{3}}\} + Re\{\Lambda_{c5}e^{j\frac{2\pi}{3}}\}}{3} \tag{7}$$

$$V_{5i} = \frac{Im\{\Lambda_{a5}\} + Im\{\Lambda_{b5}e^{-j\frac{2\pi}{3}}\} + Im\{\Lambda_{c5}e^{j\frac{2\pi}{3}}\}}{3} \tag{8}$$

In a three phase system the voltage of phases a, b, and c, must always sum to zero. This allows one of the phase voltages to be eliminated from equations (7) and (8) using the following equations:

$$v_{b5}=-(v_{a5}+v_{c5}) \tag{9}$$

$$\Lambda_{b5}=-(\Lambda_{a5}+\Lambda_{c5}) \tag{10}$$

Using equations (9) and (10), equations (7) and (8) can be reduced to the following:

$$V_{5r} = \frac{\lambda_{a5r}}{2} - \frac{\lambda_{a5i}}{2\sqrt{3}} - \frac{\lambda_{c5i}}{\sqrt{3}} \quad (11)$$

$$V_{5i} = \frac{\lambda_{a5i}}{2} + \frac{\lambda_{a5r}}{2\sqrt{3}} + \frac{\lambda_{c5r}}{\sqrt{3}} \quad (12)$$

The harmonic detectors 36 and 38 output the real and imaginary components of the amplitude of the harmonic distortion signal according to equations (7) and (8) or simplified equations (11) and (12).

For a single phase system as shown in FIG. 4, the output of the A/D converter 34 is applied to the inputs of a real and imaginary harmonic detector 36 and 38. The harmonic distortion signal is detected by the signal correlation function 39 and the amplitude of the signal is determined by the amplitude detection function 41.

Referring to FIGS. 3 and 4, the amplitude components of the distortion signal are transmitted to a pair of proportional integral (PI) compensators 44 and 46. The proportional integral compensators 44 and 46 generate the correction signal required to drive the input signal of the IP compensators 44 and 46 toward zero. The compensators 44 and 46 effectively estimate a real and imaginary component of the distortion correction signal.

The estimated real component of the distortion correction signal is multiplied by a value from a fifth harmonic cosine look-up table 51 at a multiplier 80. The cosine look-up table 51 contains the values necessary to generate a digital representation of the real component of the harmonic distortion correction signal. The cosine table values are scaled by the output of PI compensator 44 to generate the real component of the distortion correction signal.

The values from the look-up table 51 also compensate for the phase shift introduced by the system. The phase shift of the generated signals is determined by the amount of phase shift introduced by the circuitry of the UPS 8 (the PWM inverter, the output filter, etc.). This phase shift is corrected by adjusting the phase of the correction signal by some angle $\phi$. The angle $\phi$ is predetermined based upon the phase shifts caused by the UPS circuit components.

The imaginary component of the distortion correction signal is generated in a manner similar to the generation of the real component. The output of the PI compensator 46 is multiplied at a multiplier 82 by values output by a fifth harmonic sine look-up table 53. These values are also computed to compensate for the phase shift introduced by the system.

The real and imaginary components of the correction signal are combined at a summer 90. The distortion correction signal value for the 5th harmonic generated at the summer 90 is represented by the following equation:

$$V_{comp} = h[V_{5r}]\cos\left(\frac{5*2\pi n}{N} + \phi\right) + -h[V_{5i}]\sin\left(\frac{5*2\pi n}{N} + \phi\right) \quad (13)$$

wherein:

h[−] represents application of the PI compensator; and $\phi$ represents the phase correction angle The distortion correction signal is subtracted from the value input to the PWM inverter 28 at the feedback subtracter 92. This adjusts the pulse widths generated by the PWM inverter 28 to substantially cancel out the harmonic distortion at the output of the UPS 9.

Figure 5:
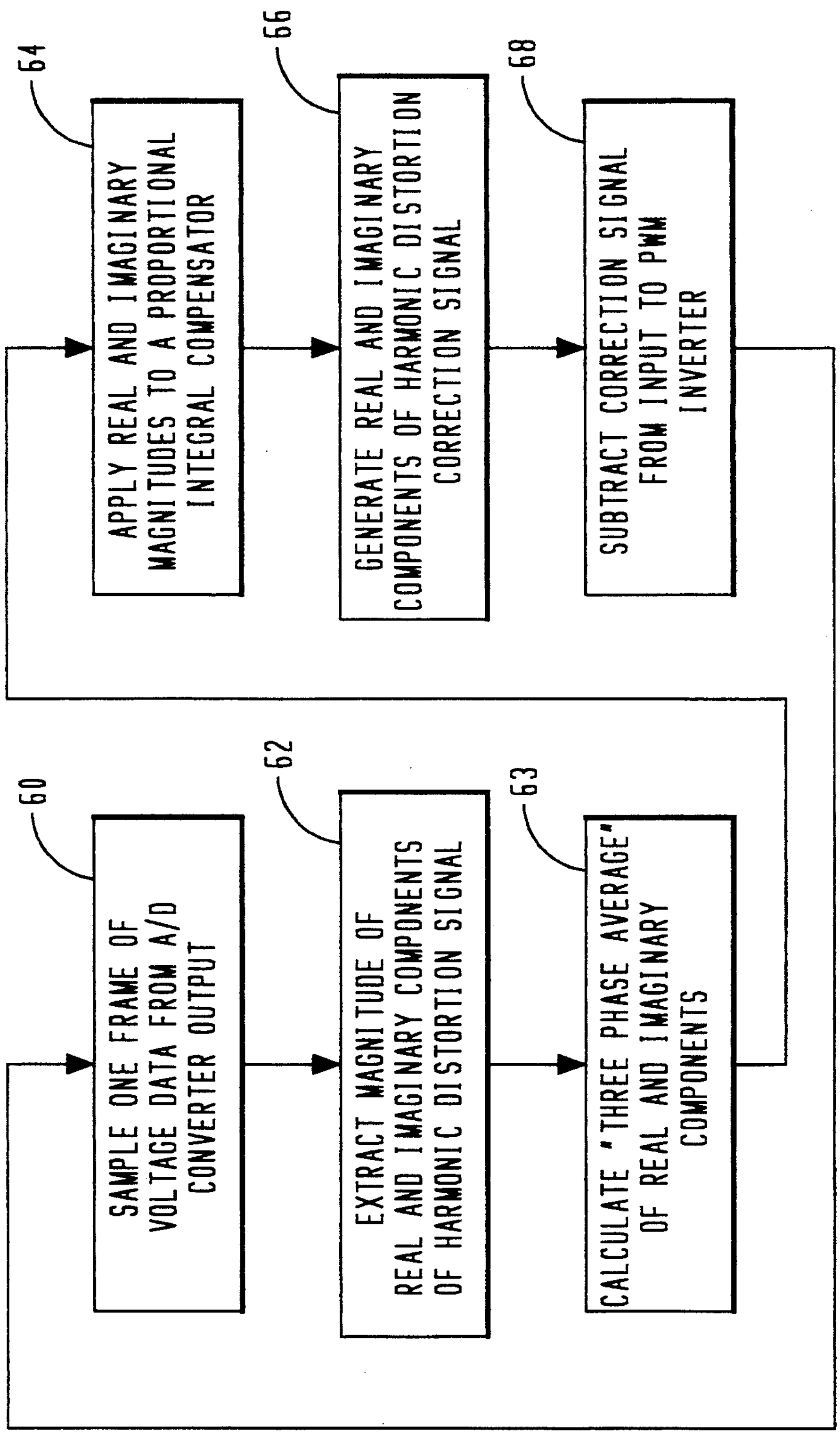
FIG. 5 is a flow chart illustrating the operation of the negative feedback loop processing used to generate a harmonic distortion correction signal.

Referring now to FIG. 5, there is a flow-chart illustrating the method by which the correction signal of the negative feedback loop is determined by the processor 24. First, one frame of voltage data from the A/D converter 34 is sampled at step 60 by the processor 24. The frame of voltage data is processed at step 62 to extract the amplitude of the real and imaginary components of the harmonic distortion signal. This process involves detecting the harmonic distortion signal and determining the amplitude of each phase of the signal. The three phase average of the real and imaginary components of the distortion is calculated at step 63 using the values of the detected distortion signal for each phase.

Once the magnitude of the real and imaginary components are determined, the values are processed at step 64 by the proportional integral (PI) compensator (44 or 46) to estimate a correction signal that will drive the input of the PI compensator toward zero. At step 66, the real and imaginary components of the correction signal are generated and scaled by the results from the proportional integral compensator. The signal generated at step 66 is subtracted at step 68 from the value input to the feedback subtractor 92 and input to the PWM inverter 28 to substantially remove harmonic distortion from the output signal. The processor then returns to step 60 and samples another frame of voltage data from the A/D converter 34 and continues the process.

Although preferred embodiments of the invention have been illustrated in the accompanying drawings and described in the foregoing detailed description, it will be understood that the invention is not limited to the embodiments disclosed, but is capable of numerous rearrangements and modifications of parts and elements without departing from the spirit of the invention.

We claim:

1. A system for generating a harmonic distortion correction signal for application to an input of a PWM inverter in an uninterruptable power supply, said power supply having a frequency look-up table for generating an input signal to the PWM inverter, said supply including an output filter for filtering an output of the PWM inverter, said system comprising:

means for digitizing an output signal of the output filter;

first means for processing the digitized signal to detect real and imaginary components of harmonic distortion within the digitized signal; and second means for processing the detected real and imaginary components of the harmonic distortion to generate real and imaginary components of the harmonic distortion correction signal for application to the input of the PWM inverter to substantially cancel the harmonic distortion from the output signal.

2. The system as in claim 1 wherein the first means for processing, comprises:

means for detecting the real and imaginary components of the harmonic distortion within the output signal; and means for calculating the amplitude of the detected real and imaginary components of the harmonic distortion.

3. The system as in claim 2 wherein the second means for processing, comprises:

means responsive to the calculated amplitude of the real and imaginary components of the harmonic distortion for identifying the real and imaginary components of the harmonic distortion correction signal; and means responsive to the identified real and imaginary components for generating the harmonic distortion correction signal for application to the input of the PWM inverter.

4. The system as in claim 3 wherein the means responsive to the calculated amplitude, comprises:

a proportional integral compensation means responsive to the real and imaginary components of the detected amplitude for identifying the real and imaginary components of the harmonic distortion correction signal.

5. The system as in claim 3 wherein the means responsive to the identified components for generating comprises a harmonic compensation means, the harmonic compensation means further comprising:

means for generating the real component of the harmonic distortion correction signal; and means for generating the imaginary component of the harmonic distortion correction signal.

6. The system as in claim 5 wherein the means for generating the real component of the harmonic distortion correction signal comprises:

a cosine function table for generating cosine function values; and a multiplier for multiplying the cosine function values by the real component the harmonic distortion correction signal.

7. The system as in claim 5 wherein the means for generating the imaginary component of the harmonic distortion correction signal comprises:

a sine function table for generating sine function values; and a multiplier for multiplying the sine function values by the imaginary component of the harmonic distortion correction signal.

8. An apparatus for cancelling distortions from an output voltage signal, comprising:

means for detecting the distortion;

means for calculating real and imaginary components of a magnitude of the distortion.

means responsive to the real and imaginary components of the calculated magnitude for identifying real and imaginary components of a distortion correction signal; and means responsive to the identified distortion correction signal components for generating the distortion correction signal for cancelling the distortions from the output voltage signal.

9. A method for generating a harmonic distortion correction signal to substantially remove harmonic distortion from an output signal of a power supply, comprising the steps of:

detecting real and imaginary components of harmonic distortion within the output signal;

calculating the amplitude of the real and imaginary components of the detected harmonic distortion;

generating the harmonic distortion correction signal from the calculated real and imaginary components of the detected harmonic distortion; and applying the harmonic distortion correction signal to the power supply to substantially cancel the harmonic distortion from the output signal.

10. The method as in claim 9, wherein the step of generating the harmonic distortion correction signal comprises the steps of:

identifying components of the harmonic distortion correction signal that substantially cancels the detected harmonic distortion; and generating the harmonic distortion correction signal according to the identified components of the harmonic distortion correction signal.

11. The method as in claim 9, wherein the step of calculating the amplitude further comprises the step of determining a three phase average of the detected harmonic distortion.

12. A system for generating a harmonic distortion correction signal to substantially cancel the harmonic distortion from an output signal of a power supply, comprising:

means responsive to the output signal to detect harmonic distortion;

means for calculating an amplitude of the detected harmonic distortion;

proportional integral compensation means responsive to real and imaginary components of the calculated amplitude for identifying real and imaginary components of a harmonic distortion correction signal that substantially cancels the detected harmonic distortion; and means responsive to the identified components for generating the harmonic distortion correction signal.

13. The system as in claim 12 further including means for sampling and digitizing the output signal prior to detecting the harmonic distortion.

14. The system as in claim 12 wherein the means for calculating the amplitude further comprises means for calculating the three phase average magnitude of the harmonic distortion.

15. A system for generating a harmonic distortion correction signal to substantially cancel the harmonic distortion from an output signal of a power supply, comprising:

means responsive to the output signal to detect harmonic distortion;

means for calculating an amplitude of the detected harmonic distortion;

means responsive to the calculated amplitude of the harmonic distortion for identifying the components of a harmonic distortion signal that substantially cancels the detected harmonic distortion; and means responsive to the identified components for generating the harmonic distortion correction signal, said means comprising:

means for generating the real component of the harmonic distortion correction signal; and means for generating the imaginary component of the harmonic distortion correction signal; and means responsive to the identified components for generating the harmonic distortion correction signal.

16. The system as in claim 15 wherein the means for generating the real component of the harmonic distortion correction signal, comprises:

a cosine function table for generating cosine function values; and a multiplier for multiplying the cosine function values by the real component of the harmonic distortion correction signal.

17. The system as in claim 15 wherein the means for generating the imaginary component of the harmonic distortion correction signal, comprises:

a sine function table for generating sine function values; and means for multiplying the sine-function values by the imaginary component of the harmonic distortion correction signal.

* * * * *